United States Patent [19]

Hsu

[11] Patent Number: 4,923,940
[45] Date of Patent: May 8, 1990

[54] POLYCARBOXYLIC ACIDS WITH HIGHER THICKENING CAPACITY AND BETTER CLARITY

[75] Inventor: Chin C. Hsu, Avon Lake, Ohio

[73] Assignee: The B.F. Goodrich Company, Akron, Ohio

[21] Appl. No.: 324,530

[22] Filed: Mar. 16, 1989

Related U.S. Application Data

[62] Division of Ser. No. 157,685, Feb. 19, 1988.

[51] Int. Cl.$^5$ ................................................. C08F 2/00
[52] U.S. Cl. ..................................... 526/208; 526/212; 526/317.1; 526/318.6
[58] Field of Search ............... 526/208, 212, 317.1, 526/318.6

[56] References Cited

U.S. PATENT DOCUMENTS

| | | | |
|---|---|---|---|
| 4,267,103 | 5/1981 | Cohen | 526/208 |
| 4,758,641 | 7/1988 | Hsu | 526/208 |

FOREIGN PATENT DOCUMENTS

| | | | |
|---|---|---|---|
| 410042 | 4/1974 | U.S.S.R. | 526/208 |
| 304681 | 2/1930 | United Kingdom | 526/208 |
| 882113 | 11/1961 | United Kingdom | 526/208 |

*Primary Examiner*—Joseph L. Schofer
*Assistant Examiner*—N. Sarofim
*Attorney, Agent, or Firm*—George A. Kap; Nestor W. Shust

[57] ABSTRACT

Polymer and process of polymerizing a monomer charge containing at least 85% of an olefinically unsaturated carboxyl monomer of 3 to 5 carbon atoms at up to 15% of a copolymerizable comonomer, in the presence of a mixed reaction medium containing an organic solvent and a hydrocarbon solvent in respective weight ratio of 95/5 to 1/99, said organic solvent is selected from ketones, esters, ethers, and alcohols having solubility parameter in the range of 8 to 15 and said hydrocarbon solvent is selected from aliphatic and cyclic aliphatic alkanes containing 4 to 12 carbon atoms and non-benzene aromatics of 7 to 9 carbon atoms. Said organic solvent and said hydrocarbon solvent are preferably liquid at room temperature. Viscosity of the 0.2% by weight polymer is in excess of 15,000 cps, preferably in excess of 20,000 cps, and its clarity is at least 80%, preferably 85% transmittance. Viscosity of 1% mucilages containing 1% sodium chloride salt is greater than 5,000 cps, preferably greater than 8,000 cps.

8 Claims, No Drawings

POLYCARBOXYLIC ACIDS WITH HIGHER THICKENING CAPACITY AND BETTER CLARITY

This application is a divisional application of Ser. No. 157,685, filed Feb. 19, 1988.

Polymers of unsaturated carboxylic acids and salts thereof are well known. These polymers include homopolymers and copolymers which contain up to 10 weight percent of other copolymerizable monomers. Typical monomers include acrylic acid, methacrylic acid, maleic acid or its anhydride, itaconic acid, and the like. U.S. Pat. No. 2,798,053, for instance, discloses copolymers of acrylic acid with small amounts of polyalkenyl polyether crosslinkers which are gel-like and, especially in the form of their salts, can absorb large quantities of water or solvents with subsequent substantial increase in volume. U.S. Pat. Nos. 3,940,351 and 4,062,817 describe polymers of an unsaturated carboxylic acid and at least one acrylic or methacrylic ester wherein the alkyl groups contain 1 to 30 carbon atoms. Such polymers are also effective thickening agents, even in the presence of substantial amounts of inorganic salts. U.S. Pat. Nos. 3,915,921 and 4,066,583 disclose preparation of same or similar polymers in similar systems.

U.S. Pat. No. 4,267,103 discloses polymers of unsaturated carboxylic acids or salts thereof in various solvents wherein more than 1% by weight of the carboxyl groups are neutralized. Such polymers have molecular weight greater than 500 and up to several million, but generally, in the range of 10,000 to one million. Such polymers are also effective thickening agents.

U.S. patent application entitled, "Polycarboxylic Acids With Small Amount of Residual Monomer" bears Ser. No. 17,966 and was filed Feb. 24, 1987 now U.S. Pat. No. 4,758,641. That case discloses polymerization of a partially neutralized acrylic acid, or a like monomer, in the presence of acetone or a lower alkyl acetate reaction medium and in the presence of initiator selected from lauroyl peroxide and peroxydicarbonates whereby a polymer is obtained with a low level of unreacted monomer.

SUMMARY OF THE INVENTION

Polymers of a monounsaturated carboxylic acid of 3 to 5 carbon atoms, or its water-soluble salt, are prepared by polymerizing one or more of such monomers with up to about 15% of one or more of other copolymerizable monomers in the presence of a reaction medium that is a mixture of an organic solvent with a hydrocarbon solvent, also in the Presence of an effective amount of a crosslinker and an initiator. Such polymers have a higher thickening property and better clarity, when measured in water when compared to polymers prepared in individual solvents alone. Such polymers can have a low level of unreacted monomers of less than 0.2%, in a preferred embodiment.

DETAILED DESCRIPTION OF THE INVENTION

The polymers prepared in a mixed reaction medium have higher viscosities, in presence of or absence of salt, when viscosity of a mucilage is measured, which is important in thickening applications where higher viscosity is translated into a higher thickening capacity. Such polymers prepared in a mixed reaction medium also have better clarity, which is especially essential in preparation of clear products such as hair gels, certain shampoos, and cosmetic products. The low level of unreacted monomers in the polymers prepared in the presence of a mixed reaction medium is also important especially in applications such as cosmetics and pharmaceuticals, where toxicity of ingredients is closely monitored and only ingredients which meet stringent requirements are used. Viscosity of the 0.2% mucilage in absence of salt, prepared in a mixed solvent is greater than 15,000 cps, preferably in excess of 20,000 cps. The 0.2% mucilage is prepared by adding 0.2% of the polymer described herein in water and measuring viscosity thereof after the polymer dissolves or disperses in the water and pH adjusted to 7 to 8 with 18% sodium hydroxide solution. In the presence of 1% sodium chloride salt, the 1% mucilage viscosity is greater than 5,000 cps, preferably greater than 8,000 cps. Gel clarity is measured as the percent transmission of light at 420 mm using a Brinkman colorimeter and should be better than 80%, preferably better than 85% transmittance. Viscosity referred to herein is Brookfield viscosity measured with an RVT model at 20 rpm at room temperature.

The polymers of this invention include homopolymers and copolymers. At least 85%, preferably at least 90% of the monomers are selected from the principal monomers selected from monounsaturated monocarboxylic and dicarboxylic acids and salts thereof. The secondary monomers or comonomers comprise up to 15% by weight, preferably up to 10%, such as 1 to 10% of the monomer mix. Molecular weight of such polymers is greater than about 100,000 and up to several million, preferably about one-half million to about three million weight average molecular weight.

The principal monomers are selected from olefinically unsaturated monocarboxylic and dicarboxylic acids and salts thereof containing 3 to 5 carbon atoms, preferably monocarboxylic acids, salts and anhydrides thereof. Suitable monomers in this class include acrylic acid, methacrylic acid, ethacrylic acid, alpha-chloroacrylic acid, alpha-cyano acrylic acid, itaconic acid, maleic acid and maleic anhydride. In this class of monomers, acrylic acid, methacrylic acid, maleic acid, and maleic anhydride are preferred because of generally lower cost, ready availability, and ability to form superior polymers. Acrylic acid is most preferred in this class of monomers.

The secondary monomers or comonomers are selected from monomers which contain at least one terminal $CH_2=C<$ or vinylidene group. Such comonomers include acrylic esters which are represented by the formula

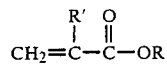

wherein R is an alkyl group containing 1 to 30 carbon atoms. This group of comonomers includes the acrylic acid esters with aliphatic groups wherein R contains 1 to 30, preferably 10 to 20 carbon atoms. In these comonomers, R' is hydrogen or a lower alkyl, preferably hydrogen or methyl group. Examples of the aliphatic acrylic esters include decycl acrylate, isodecyl acrylate, lauroyl acrylate, stearyl acrylate, behenyl acrylate, melissyl acrylate, methyl acrylate, ethyl acrylate, propyl acrylate, isopropyl acrylate, n-butyl acrylate, isobutyl acrylate, n-hexyl acrylate, heptyl acrylate, octyl acrylate, ethyhexyl acrylate, and the corresponding methacrylates.

Other suitable monomers can also be used as secondary comonomers. These include acrylamidosulfonic acids; acrylic nitriles such as acrylonitrile; acrylic amides such as acrylamide; N-alkylol amides such as N-methylol acrylamide; alpha olefins of 2 to 12 carbon atoms such as ethylene and propylene; dienes such as butadiene and piperylene; ethylidene norbornene and dicyclopentadiene; vinyl esters such as vinyl acetate and vinyl benzoate; vinyl aromatics such as styrene; vinyl and allyl ethers and ketones such as vinyl methyl ether and vinyl ketone; vinyl nitriles; cycloalkyl acrylates; vinyl halides and vinylidene halides such as vinyl chloride and vinylidene chloride; and other comonomers described in cols. 4 and 5 of U.S. Pat. No. 4,267,103.

The polymers may be crosslinked with any polyfunctional vinylidene monomer containing at least two terminal $CH_2=C<$ groups, including for example, butadiene, isoprene, divinyl benzene, divinyl naphthalene, allyl acrylates and the like. A particularly useful crosslinking monomer for use in preparing the copolymers, if one is employed, is a polyalkenyl polyether having more than one alkenyl ether grouping per molecule. The most useful of these possess alkenyl groups in which an olefinic double bond is present attached to a terminal methylene grouping, $CH_2=C<$. Efficiency of the polyether crosslinking agent increases with the number of potentially polymerizable groups on the molecule. It is preferred to utilize polyethers containing an average of two or more alkenyl ether groupings per molecule. Typical crosslinking agents are allyl pentaerythritol, allyl sucrose, allyl acrylate, allyl methacrylate, trimethylolpropane diallyl ether, diallyl ethers of polyether diols with molecular weight of 50 to 1000, 1,6-hexanediol diacrylate, trimethylolpropane triacrylate, pentaerythritol triacrylate, tetramethylene diacrylate, ethylene diacrylate, triethylene glycol dimethacrylate, and the like. Crosslinking of the polymers provides improved ability for the copolymers to swell.

The polymeric mixtures described herein contain up to about 5% by weight of a crosslinking monomer, based on the total weight of the monomer charge plus other monomers, if present, and more preferably, 0.1 to 2.0% by weight. To obtain good clarity, it is recommended that allyl pentaerythritol crosslinker be used at a level of 0.1 to 1.4%, preferably 0.2 to 1.2%; allyl acrylate be used at a level of 0.1 to 0.8%, preferably 0.2 to 0.7%; allyl sucrose be used at a level of 0.1 to 1.4%, preferably 0.2 to 1.0%, and trimethylol propane diallylether be used at a level of 0.4 to 2.5%, preferably 0.6 to 2.0%. Good clarity herein is defined as clarity exceeding 80%, preferably exceeding 85% transmittance.

The reaction media for solvents which are suitable herein are preferably liquid at room temperature of 22° C., or at least one is a liquid so that it can solubilize the other. The reaction media are mixtures of one or more organic solvents with one or more hydrocarbons. The organic solvents contemplated herein include ketones, esters, ethers, and saturated alcohols. The esters are especially selected from lower alkyl acetates containing 1 to 6, preferably 2 to 4, carbon atoms in the alkyl group.

Specific examples of suitable organic reaction solvents include ethyl acetate, butyl acetate, methyl acetate, isopropyl acetate, propyl acetate, methyl ethyl ketone, butyl propionate, cyclohexanone, and other non-halogenated organic solvents. Particularly suitable herein are ketones of 3 to 6 carbons, and esters of 2 to 4 carbons, and saturated alcohols of 1 to 12 carbons which have a solubility parameter in the range of about 8 to 15, especially 9 to 11. U.S. Pat. No. 4,267,103 discloses some of the organic solvents suitable herein at bottom of col. 6 and col. 7. This patent is incorporated herein by reference.

The hydrocarbon solvents which are mixed with the organic solvents in the preparation of a mixed reaction medium include straight-chain, branched-chain, and cyclic aliphatics which contain 4 to 12, preferably 5 to 9, carbon atoms. Specific examples of hydrocarbon solvents suitable herein include alkanes, cycloalkanes, and aromatics, such as pentanes, hexanes, heptanes, octanes, cyclohexane, cycloheptane, and non-benzene aromatic solvents such as toluene, xylene, and other non-halogenated hydrocarbon solvents. Benzene is excluded.

The organic solvents and hydrocarbon solvents can be premixed and the mixed reaction medium can be used in the polymerization reaction. The organic solvents and the hydrocarbon solvents can also be added separately to a reaction mixture and polymerization reaction can be carried out thereafter. Whether the components of the reaction medium are premixed or are added separately to a reaction mixture is immaterial as long as the polymerization reaction is carried out in the presence of at least one organic solvent and at least one hydrocarbon solvent. The relative weight ratio of at least one organic solvent to at least one hydrocarbon solvent can be in the range of 95/5 to 1/99, Preferably 80/20 to 5/95, and especially 2:1 to 1:2. The amount of reaction medium or mixed solvent will normally be in excess of the monomer or monomers to be polymerized and the proportion may vary from at least 1% by weight of monomer(s) and 99% reaction medium to 50% monomer(s) and 50% reaction medium. The concentration of the monomer(s) is normally 10 to 25% by weight in the reaction medium.

Amount of water in the reaction medium should be as low as possible since if water is allowed to exceed about 3% in the reaction medium, the reaction mass becomes a solid, rubbery mass, which is undesirable. Preferable water content in the solvent mixtures is 0.5% or less and particularly, less than 0.1%.

Polymerization of the monomer in the reaction medium is usually carried out in the presence of a free radical initiator in a closed vessel in an inert atmosphere and under autogenous pressure or artificially-induced pressure, or in an open vessel under reflux at atmospheric pressure under an inert blanket. Temperature of the polymerization may be varied between 0° and 100° C., preferably about 40° to 85° C., and more preferably 45° to 60° C. or 70° to 80° C., depending on the type of initiator selected. Suitable free radical initiators are those which will convert essentially all of the monomer to polymer at the reaction temperature. Examples of such free radical initiators include di (2-ethylhexyl) peroxydicarbonate, di(sec-butyl) peroxydicarbonate, di(isopropyl) peroxydicarbonate, di(cyclohexyl) peroxydicarbonate, di(cetyl) peroxydicarbonate, di(n-propyl) peroxydicarbonate, lauroyl peroxide, and other like peroxides and peroxydicarbonates. The di(2-ethylhexyl) peroxydicarbonate is especially effective at a reaction temperature of 45° to 60° C. whereas lauroyl peroxide is especially effective at a reaction temperature of 70° to 80° C. Amount of the initiator is generally less than 2%, preferably 0.1 to 1%, by weight based on the weight of the monomer charge.

This process can be carried out and the desired properties attained without partial neutralization of the carboxyl monomer, however, the invention herein can be carried out with partial acid neutralization. Partial neutralization herein means neutralization up to 10% of the carboxylic acid groups in the carboxyl monomer neutralized.

The invention is further demonstrated by the following examples which show the higher thickening property and improved clarity obtained by the polymers prepared in a mixed reaction medium containing at least one organic solvent and at least one hydrocarbon solvent. Most of the organic solvents and the hydrocarbon solvents have been used in the past as reaction media for polymerizing acrylic acid polymers but not in combination with each other which produces unexpected results.

EXAMPLE 1

This example demonstrates the improved viscosity obtained when a mixed solvent is used as compared to a single solvent.

Acrylic acid was polymerized in a 2-liter jacketed glass reactor equipped with a reflux condenser and a circulation water bath for temperature control. The reaction mixture contained 1320 grams of a reaction medium, 180 grams of acrylic acid, 5.18 grams of anhydrous potassium carbonate, and 2.16 grams of allyl pentaerythritol crosslinker. Mixed reaction media were used although for comparative purposes, single reaction media were used in certain runs. The 5.18 grams of anhydrous potassium carbonate was effective in neutralizing 3% of the carboxyl groups on the acrylic acid to a potassium salt.

The reactor was then sparged with nitrogen for 30 minutes and 0.9 gram of di(2-ethylhexyl) peroxydicarbonate initiator dissolved in the reaction medium was added over a period of the reaction time. The contents of the reactor were heated to 50° C. and the polymerization reaction was continued for six hours. The product was then dried overnight in a ROTO-VAP drier at 95°–105° C. and 27 inches of mercury. Viscosity of the resulting dried polymer was then evaluated by measuring viscosity of the 0.2% and 0.5% mucilages in water at pH of 7.3 to 7.8. The pH adjustment was done with 18% sodium hydroxide solution. The 0.2% mucilage contained 0.2% polyacrylic acid product in water whereas the 0.5% mucilage contained 0.5% of the polyacrylic acid product. The viscosity was determined with an RVT model Brookfield viscometer rotated at 20 rpm. Viscosity results for the various runs employing ethyl acetate or cyclohexane as reaction media, or mixtures of the two, is given in Table I, below, where amounts are given in grams, unless otherwise indicated:

TABLE I

| Run No. | Cyclo-hexane | Ethyl Acetate | Acrylic Acid | Cross-linker |
|---|---|---|---|---|
| 1 | 66 | 1254 | 180 | 1.80 |
| 2 | 396 | 924 | 180 | 1.80 |
| 3 | 528 | 792 | 180 | 1.80 |
| 4 | 607.2 | 712.8 | 180 | 1.80 |
| 5 | 792 | 528 | 180 | 1.80 |
| 6 | 1056 | 264 | 180 | 1.80 |
| 7 | 1254 | 66 | 180 | 1.80 |
| 8 | 0 | 1320 | 180 | 2.16 |
| 9 | 1320 | 0 | 180 | 1.80 |

TABLE I-continued

| Run No. | Initiator | Mucilage Viscosity, cps | |
|---|---|---|---|
| | | 0.2% | 0.5% |
| 1 | 0.90 | 7,300 | 53,500 |
| 2 | 0.90 | 17,700 | 44,100 |
| 3 | 0.90 | 19,900 | 49,700 |
| 4 | 0.90 | 27,400 | 52,500 |
| 5 | 0.90 | 24,300 | 52,000 |
| 6 | 0.90 | 24,200 | 46,500 |
| 7 | 0.90 | 16,400 | 33,300 |
| 8 | 0.90 | 8,900 | 46,000 |
| 9 | 0.90 | 10,100 | 24,200 |

It should be apparent from the above results that mixed solvents yield polymers that, in the form of mucilages, have substantially higher viscosities than for polymers prepared in a single solvent.

EXAMPLE 2

This example demonstrates the use of n-hexane and ethyl acetate as mixed solvents in the polymerization of acrylic acid homopolymer.

A series of polymerizations were conducted in mixed reaction media of n-hexane and ethyl acetate pursuant to the procedure set forth in Ex. 1 using allyl pentaerythritol crosslinker and di(2-ethylhexyl) peroxydicarbonate initiator. Recipes and viscosity results are given in Table II, below, where amount are given in grams, unless otherwise indicated:

TABLE II

| Run No. | n-hexane | Ethyl Acetate | Acrylic Acid | Cross-linker |
|---|---|---|---|---|
| 1 | 1335 | 0 | 165 | 1.65 |
| 2 | 1068 | 267 | 165 | 1.65 |
| 3 | 801 | 534 | 165 | 1.65 |
| 4 | 667.5 | 667.5 | 165 | 1.65 |
| 5 | 534 | 801 | 165 | 1.65 |
| 6 | 267 | 1068 | 165 | 1.65 |

| Run No. | Initiator | Mucilage Viscosity, cps | |
|---|---|---|---|
| | | 0.2% | 0.5% |
| 1 | 0.825 | 4,000 | 18,500 |
| 2 | 0.825 | 22,500 | 66,000 |
| 3 | 0.825 | 17,500 | 54,000 |
| 4 | 0.825 | 27,000 | 65,000 |
| 5 | 0.825 | 22,000 | 50,000 |
| 6 | 0.825 | 16,300 | 49,000 |

EXAMPLE 3

This example demonstrates the use of mixed solvents in the polymerization of acrylic acid polymer and mucilage viscosities and clarity of the resulting acrylic polymer.

Acrylic acid was polymerized at 50° C. pursuant to the procedure in Ex. 1 in a mixed reaction medium containing 720.9 grams of ethyl acetate and 614.1 grams of cyclohexane, and in the presence of 1.155 grams of allyl acrylate crosslinker and 0.825 gram of di(2-ethylhexyl) peroxydicarbonate initiator. The other parameters were the same as in Ex. 1. The 0.2% and 0.5% mucilages prepared in water with the resulting polyacrylic acid had respective viscosities of 27,500 cps and 49,000 cps and respective clarity of 93.9% and 90.1%.

EXAMPLE 4

This example demonstrates the use of mixed solvents at different polymerization temperatures.

A series of polymerizations were conducted at 45° C., 55° C., and pursuant to the procedure of Ex. 1. A fixed recipe was employed with a mixed reaction medium containing 720.9 grams of ethyl acetate and 614.1 grams of cyclohexane, 1.98 grams of allyl pentaerythritol crosslinker and 0.495 grams of di(2-ethylhexyl) peroxydicarbonate initiator. The resulting polymers had the mucilage viscosities in cps and clarity, given in the following table:

TABLE IV

| Reaction Temp. °C. | Mucilage Viscosity and Clarity | | | |
|---|---|---|---|---|
| | 0.2% | Clarity | 0.5% | Clarity |
| 45 | 26,500 | 82.0% | 81,000 | 84.0% |
| 55 | 24,300 | 92.3% | 56,000 | 93.6% |
| 60 | 18,800 | 90.2% | 51,500 | 91.6% |

EXAMPLE 5

This example demonstrates the use of mixed solvents at different degrees of neutralization of the acrylic acid polymers.

A series of polymerizations were run pursuant to the procedure set forth in Ex. 1 but varying degree of neutralization of acrylic acid. The variables were the same as in Ex. 1. Amounts of anhydrous potassium carbonate in runs #1, #2, and #3 were 0.86 grams, 2.59 grams, and 5.18 grams, respectively. Results of mucilage viscosities in cps are given in Table V below along with residual acrylic acid (AA) monomer in parts per million (ppm):

TABLE V

| Run No. | % Acrylic Acid Neutralized | Mucilage 0.2% | Viscosity 0.5% | Residual AA |
|---|---|---|---|---|
| 1 | 0.5 | 23,700 | 45,700 | 939 |
| 2 | 1.5 | 22,700 | 35,600 | 790 |
| 3 | 3.0 | 18,000 | 24,200 | 235 |

EXAMPLE 6

This example demonstrates the use of allyl acrylate, allyl sucrose, allyl methacrylate, and trimethylolpropane diallylether as crosslinking monomers.

Polymerization procedure of Ex. 1 was followed here using 165 grams acrylic acid, a mixed solvent of 720.9 grams of ethyl acetate and 614.1 grams of cyclohexane, 0.825 gram di(2-ethylhexyl) peroxydicarbonate (EHP) initiator, with a reaction time of 6 hours and polymerization temperature of 50° C. The contraction "phm" represents weight parts per 100 parts of acrylic acid in the recipe. Results of viscosity and clarity given in parentheses are set forth in Table VI, below:

TABLE VI

| | Crosslinker Type & Clarity | | | |
|---|---|---|---|---|
| Mucilage Visc., cps. | Allyl Sucrose 1.0 phm | Allyl Acrylate 0.6 phm | Allyl Methacrylate 0.79 phm | TMPDAE* 1.50 phm |
| 0.2% | 16,500 (83) | 21,000 (95.3) | 9,350 (62.1) | 12,700 (90.1) |
| 0.5% | 54,000 (82.5) | 36,700 (95.5) | 64,000 (57.5) | 23,000 (95.6) |

*TMPDAE is trimethylol propane diallylether.

For the 0.2% mucilage, viscosity for the poly(acrylic acid) using 1.0 phm of allyl sucrose was 16,500 cps, for 0.6 phm allyl acrylate it was 21,000 cps, for 0.79 phm of allyl methacrylate it was 9,350 cps, and for 1.50 phm of trimethylolpropane diallylether it was 12,700 cps. For the 0.5% mucilages, the viscosities were much higher, as expected.

EXAMPLE 7

This example demonstrates the use of stearyl methacrylate as comonomer in polymerizing acrylic acid copolymer and thickening capacity of the resulting copolymer in the presence of salt.

Following procedure set forth in Ex. 1, 160.05 grams (97% by weight) of acrylic acid was polymerized with 4.95 grams (3% by weight) stearyl methacrylate in a mixed solvent of 720.9 grams of ethyl acetate and 614.1 grams of cyclohexane. Also used were 0.5775 gram of allyl acrylate crosslinker and 0.495 gram of di(2-ethylhexyl) peroxydicarbonate initiator. Polymerization temperature was 50° C. and reaction time was 6 hours. The resulting viscosities in the presence of the indicated amounts of sodium chloride are given in Table VII, below:

TABLE VII

| Amount of NaCl | Viscosity of 1% Mucilage | Viscosity of 2% Mucilage |
|---|---|---|
| 0% | 25,000 cps | 35,000 cps |
| 1.0% | 10,500 cps | 32,000 cps |
| 3.0% | 1,900 cps | 16,000 cps |

With 0% of sodium chloride in the 1% mucilage of the acrylic acid/stearyl methacrylate copolymer, viscosity was 25,000 cps which decreased to 10,500 cps when amount of sodium chloride of 1.0% was present in the mucilage.

EXAMPLE 8

This example demonstrates the use of the mixed solvent of iso-octane and ethyl acetate.

Amount of iso-octane was 660 grams and amount of ethyl acetate was also 660 grams. Acrylic acid in amount of 180 grams was polymerized to a homopolymer pursuant to the procedure of Ex. 1 using 1.80 grams of allyl pentaerythritol crosslinker and 0.90 gram of di(2-ethylhexyl) peroxydicarbonate initiator. Reaction time was 6 hours and reaction temperature was 50° C. Viscosity of the 0.2% mucilage was 27,400 cps and viscosity of the 0.5% mucilage was 85,000 cps.

EXAMPLE 9

This example demonstrates the use of a solvent mixture of cyclohexane and methyl ethyl ketone. Polymerization in methyl ethyl ketone as the sole solvent results in precipitation of lumpy and rubbery polymer. Polymerization was carried out pursuant to the procedure of Ex. 1 using the following recipe:
cyclohexane: 924 grams
methyl ethyl ketone: 396 grams
acrylic acid: 180 grams
allyl pentaerythritol: 1.8 grams
EHP initiator: 0.9 grams The following 0.2% and 0.5% mucilage viscosities and % transmittance were obtained:

| 0.2% | 10,700 cps | 94.9% |
| 0.5% | 19,500 cps | 91.8% |

The solvent mixture of 924 grams cyclohexane and 396 grams of methyl ethyl ketone, was on a 70/30 weight ratio basis.

EXAMPLE 10

This example demonstrates the use of n-butyl acetate alone as a solvent in run #1 and a mixture of n-butyl acetate and n-hexane as a solvent mixture in run #2 in polymerizing acrylic acid at 50° C. and in a polymerization period of 6 hours in each instance.

|  | Run #1 | Run #2 |
|---|---|---|
| n-butyl acetate | 1,320 | 660 |
| n-hexane | 0 | 660 |
| acrylic acid | 180 | 180 |
| potassium carbonate | 5.18 | 0 |
| allyl pentaerythritol crosslinker | 1.80 | 1.80 |
| EHP initiator | 0.90 | 0.90 |

Data on mucilage viscosity is given below:

|  | cps | |
|---|---|---|
| 0.2% mucilage | 5,890 | 14,400 |
| 0.5% mucilage | 7,350 | 23,700 |

Data on clarity in terms of % transmittance is given below:

| | | |
|---|---|---|
| 0.2% mucilage | 99.6% | 97.0% |
| 0.5% mucilage | 98.2% | 95.5% |

Residual acrylic acid monomer in run #1 was 0.239% and 0.146% in run #2.

EXAMPLE 11

This example demonstrates polymerization carried out at 72.8° C. in a mixed solvent using lauroyl peroxide initiator.

|  | Run #1 | Run #2 | Run #3 |
|---|---|---|---|
| acrylic acid, grams | 195 | 225 | 250 |
| cyclohexane, grams | 600.3 | 586.5 | 572.7 |
| ethyl acetate, grams | 704.7 | 688.5 | 672.3 |
| allyl acrylate, grams | 0.975 | 1.125 | 1.275 |
| lauroyl peroxide, grams | 0.975 | 1.125 | 1.275 |
| reaction temp., °C. | 72.8 | 72.8 | 72.8 |
| reaction time, hrs. | 6 | 6 | 6 |

The viscosities for the 0.2% mucilages and the 0.5% mucilages for the runs is given below:

|  | cps | | |
|---|---|---|---|
| 0.2% mucilage | 21,000 | 22,000 | 17,500 |
| 0.5% mucilage | 51,500 | 66,000 | 62,000 |

The solvent mixture was on 46/54 weight ratio basis.

I claim:

1. Process for preparing a polymer from a monomer change containing at least 85% by weight of said monomer charge of at least one olefinically unsaturated carboxylic acid of 3 to 5 carbon atoms, salts of such acid, and mixtures thereof, with up to 15% by weight of said monomer charge of at least one copolymerizable comomer in the presence of a mixed reaction medium, an effective amount of a crosslinker and an effective amount of an initiator, said process comprising the steps of polymerizing said monomer charge in said reaction medium and said crosslinker and said initiator and recovering said polymer, said mixed reaction medium comprises at least one organic solvent and at least one hydrocarbon solvent. and at least one hydrocarbon solvent.

2. Process of claim 1 wherein said organic solvent is selected from ketones, esters, ethers, alcohols, and mixtures thereof; and wherein said hydrocarbon solvent is selected from straight-chain aliphatics, branched-chain aliphatics, cyclic aliphatics, non-benzene aromatics, and mixtures thereof.

3. Process of claim 1 wherein said organic solvent is selected from ketones of 3 to 6 carbon atoms, esters of 3 to 8 carbon atoms, and mixtures thereof; and wherein said hydrocarbon solvent is selected from straight-chain aliphatics of 4–12 carbons, branched-chain aliphatics of 4–12 carbons, cyclic aliphatics of 4–12 carbons, toluene, xylene, and mixtures thereof, but excluding benzene.

4. Process of claim 3 wherein said monomer charge contains at least 90% by weight of said carboxylic acid and up to 10% of said comonomer; said carboxylic acid is selected from acrylic acid, methacrylic acid, maleic acid and its anhydride, and mixtures thereof; amount of said crosslinker is up to 5%; amount of said initiator is up to 2%; weight ratio of said organic solvent to said hydrocarbon solvent is in the range of about 95/5 to 1/99; and molecular weight of said polymer product is in the range of about 100,000 to three million.

5. Process of claim 4 wherein said carboxylic acid is selected from acrylic acid, methacrylic acid, and mixtures thereof; said comonomer is selected from alkyl acrylates containing 1 to 30 carbon atoms in said alkyl group; amount of said crosslinker is 0.2 to 2%, based on the weight of monomer charge; amount of said initiator is 0.1 to 2%, based on the weight of said monomer charge; weight ratio of said organic solvent to said hydrocarbon solvent is in the range of about 80/20 to 5/95; and viscosity of a 0.2% mucilage of the resulting polymer in water is in excess of about 15,000 cps.

6. Process of claim 5 wherein said crosslinker is selected from allyl pentaerythritol, allyl sucrose, allyl acrylate, trimethylolpropane diallylether, and mixtures thereof; wherein said initiator is selected from di(2-ethylhexyl) peroxydicabonate, di(sec-butyl) peroxydicarbonate, di(isopropyl) peroxydicarbonate, di(cyclohexyl) peroxydicarbonate, di(cetyl) peroxydicarbonate, di(n-propyl) peroxydicarbonate, lauroyl peroxide, and mixtures thereof; said organic solvent is selected from ethyl acetate, methyl acetate, isopropyl acetate, propyl acetates, butyl acetates, butyl propionate, acetone, methyl ethyl ketone, cyclohexanone, and mixtures thereof; and wherein said hydrocarbon solvent contain 5 to 9 carbon atoms and is selected from alkanes, cycloalkanes, toluene, xylene, and mixtures thereof, but excluding benzene.

7. Process of claim 5 wherein said crosslinker is selected from allyl pentaerythritol, allyl sucrose, trimethylolpropane diallylether, diallyl ethers of polyether diols having molecular weight of 50 to 1000, and mixtures thereof; wherein said initiator is selected from di(2-ethylhexyl) peroxydicarbonate, di(sec-butyl) peroxydicarbonate, di(isopropyl) peroxydicarbonate, di(cyclohexyl) peroxydicarbonate, di(cetyl) peroxydicarbonate, di(n-propyl) peroxydicarbonate, lauroyl peroxide, and mixtures thereof.

8. Process of claim 4 wherein said organic solvent is butyl acetate, iso-propyl acetate, n-propyl acetate, ethyl acetate, methyl ethyl ketone, and mixtures thereof; said hydrocarbon solvent is selected from cyclohexane, n-hexanes, and mixtures thereof; and viscosity of 0.2% mucilage of the resulting polymer in water is in excess of 20,000 cps.

* * * * *